(No Model.)
E. THOMSON & E. W. RICE, Jr.
SYSTEM OF ELECTRICAL DISTRIBUTION.
No. 468,123. Patented Feb. 2, 1892.
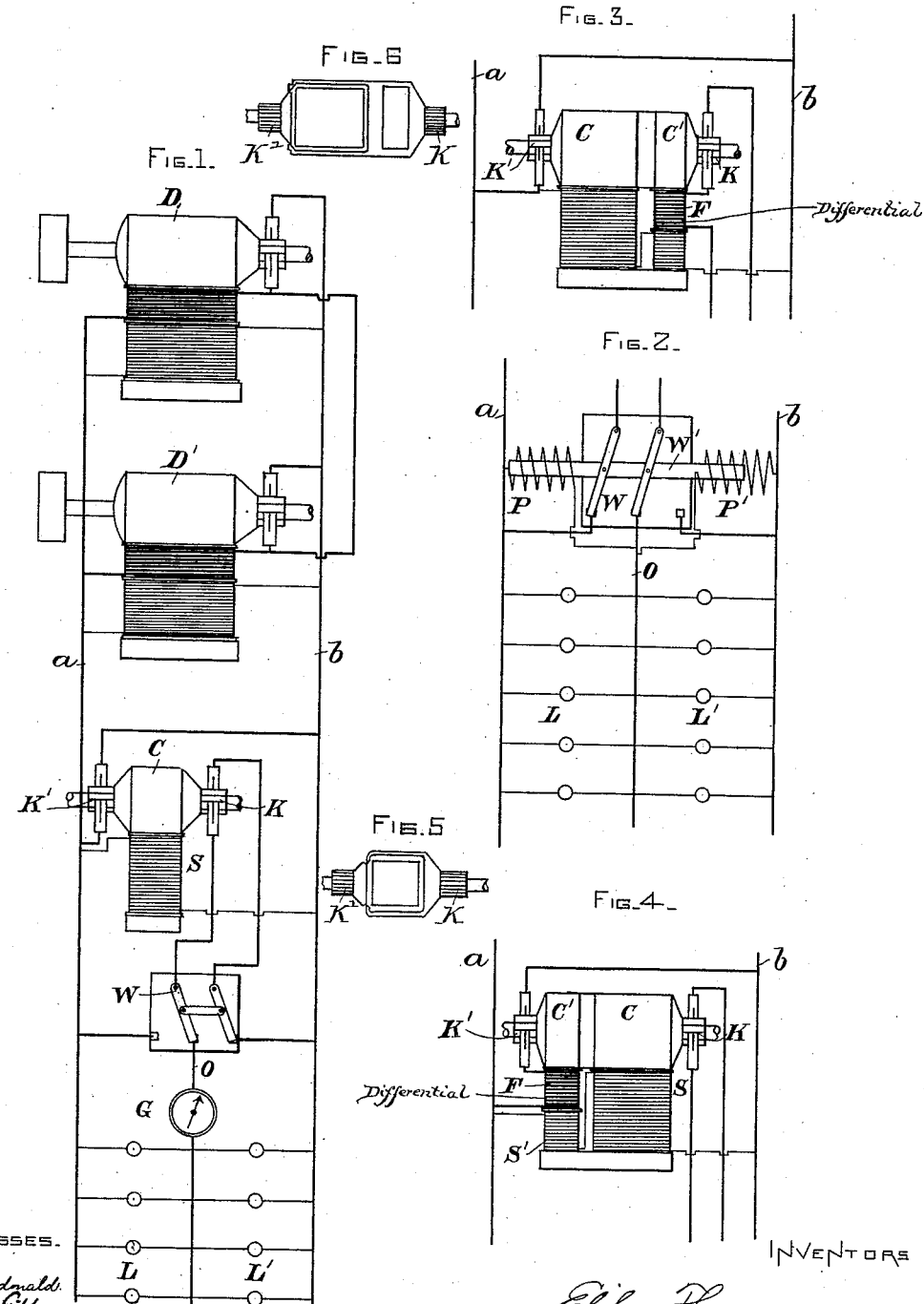

UNITED STATES PATENT OFFICE.

ELIHU THOMSON, OF SWAMPSCOTT, AND EDWIN WILBUR RICE, JR., OF LYNN, MASSACHUSETTS.

SYSTEM OF ELECTRICAL DISTRIBUTION.

SPECIFICATION forming part of Letters Patent No. 468,123, dated February 2, 1892.

Application filed March 19, 1891. Serial No. 385,702. (No model.)

*To all whom it may concern:*

Be it known that we, ELIHU THOMSON, a citizen of the United States, residing at Swampscott, county of Essex, and State of Massachusetts, and EDWIN WILBUR RICE, Jr., a citizen of the United States, residing at Lynn, county of Essex, and State of Massachusetts, have invented a certain new and useful Improvement in Systems of Electric Distribution, of which the following is a specification.

Our invention has to do with a multiple-series system of electric distribution, and the especial problem which it seeks to solve is the preservation of an equal potential on the different branches of such a system, so that the lamps or other translating devices will at all times receive the proper amount of current notwithstanding any and all inequalities of load which from time to time exist upon the branches. This is an old problem, and to gain the desired result numerous plans have been tried—as, for instance, by bringing the intermediate wire back to a divided source of energy at the power-station or by subtracting the excess of energy from the lightly-loaded side and returning it to the heavily-loaded side of the main generating-machine.

The one which we now propose is similar to that last mentioned in some respects. We couple what we call an "equalizer" in a by-path from the intermediate to one of the outer mains shunting one of the multiple groups, and, as will be made apparent from the drawings and following description, we mean by an "equalizer" a machine or other apparatus, driven or energized by the current flowing over the intermediate wire, which reconverts this surplus energy into a source of electromotive-force-returning current to the outer mains of the system, the equalizer acting when in operation simply as an auxiliary machine coupled in multiple with the main generators and assisting them in supplying current to the system as a whole. It is in reality an energy-absorbing device; but, instead of wasting the energy absorbed, which would be the case were simply a resistance used, it returns it to the system, and in this last-named capacity plays simply the same part as would an additional generator of like capacity thrown in to assist for the time being the generator or generators at the power-station.

Our means for the above end are shown in the accompanying drawings, wherein—

Figure 1 represents a multiple-series system of distribution in diagram with our invention applied thereto. Fig. 2 illustrates how an automatic shifter for throwing the equalizing-machine from one branch of the circuit to another may be arranged. Figs. 3 and 4 show somewhat different means for regulating the equalizer so as to compensate for drop of potential under varying loads. Fig. 5 is a detail view, showing in diagram the armature-windings of the equalizer of Fig. 2; and Fig. 6 similarly shows the windings of the compounded equalizer of Figs. 3 and 4.

In Fig. 1, D D' represent two generators in multiple arc, forming the main source of supply for the distribution system. Others might be added or only a single large machine used, as preferred, for collectively they constitute only a single source of supply. These generators are shown compound wound; but they may be partially or entirely excited from a separate source of current or arranged in any suitable manner, the only essential point being that they maintain a constant potential between the outer mains $a$ $b$ of the distribution system. Between these mains are coupled up multiple-arc groups of lamps or other translating devices, the groups themselves being in series, and in order to compensate for differences of load in each group, or, as we say, "branches of the system," a shunt-circuit is provided connecting the intermediate wire $o$ with one or the other of the outer mains, as the case may be. In this shunt-circuit is placed the equalizing-machine having the function described above.

As shown, this machine is of the motor-generator type, having its armature provided with two windings, one of which is connected to commutator K and the other to commutator K', (see Fig. 5,) the two windings being inductively related on the same core or disposed in any other way to effect each other. The number of turns in the winding connected to K' is such as will give double the voltage at the commutator K' to that which exists between the brushes of commutator K. In ordinary cases this will be effected by proportioning the turns of the armature-coils in the ratio of two to one, and the result, of course, is that the potential at commutator K' is equal to that maintained between the outer mains $a$ $b$. These armature-coils revolve in a field C, energized by a shunt-winding S across the mains, or arranged in other ways to secure a field magnetism of fair constancy. A galvanometer G is shown in circuit with the intermediate wire for indicating the flow of current through it, and a switch W is made use of for coupling this wire with either one of the outer mains at will through commutator K.

In Fig. 1 the side L' is supposed to be the more lightly-loaded one, and the excess of or unbalanced energy is therefore shunted around the group L', the current flowing through the armature-coil connected to K. This drives the second coil of the equalizer through the field, and the shunted energy is returned to the outer mains from commutator K'. Should the side L become the more lightly loaded, the switch W will be thrown to the left and the balance maintained as before.

In using the term "equalizer" we are aware that many kinds of apparatus other than the above may be used to advantage, varying with the general nature of the distribution system; but as we are the first to utilize the excess of energy as an auxiliary electro-motive-force-feeding current to the outer mains, we use this term in its most generic sense, and we may also say that while we recommend a motor-generator in which both coils are combined in a single machine for the sake of compactness, still the term as here used includes distinct machines as well.

Should it prove desirable to make the transfer of the equalizer from one side of the system to the other automatic, this may be done as shown in Fig. 2. Here the switch W is connected to a core W', whose ends project within two solenoid coils P P', connected in shunt between the intermediate wire and the respective outer mains. The rise of potential on the lightly-loaded side will always cause the attraction of the core to that side and the consequent shifting of the switch itself.

In Fig. 2, L is the lightly-loaded side, and the attraction due to coil P overbalancing P' throws the switch into the indicated position.

In Fig. 3 it is shown that additional features may be introduced into the construction of the equalizing-machine to secure a certain end—namely, compounding for drop of potential. The armature and field are divided into two sections, and the windings on the former are disposed as follows, as is best seen in Fig. 6: One of them—for instance, that connected to commutator K—passes around both sections and is influenced by both field-sections C C', while the second is wound only on the larger portion of the armature to the left and influenced by the major field C, energized constantly by a shunt-winding S. The smaller section C' of the field is given an initial excitation by the shunt-winding, and this is varied or cut down by the effect of a second winding F, included directly in the by-path through commutator K. Hence the greater the amount of current flowing through K the less will be the strength of the field-section C', and consequently the relation between the effective lengths of the two coils is varied, thereby furnishing means for automatic regulation taking care of the drop of potential in the machine when called upon to do considerable work. This method of regulating or compounding the motor-generator is explained more particularly in Letters Patent No. 459,423, granted to Elihu Thomson September 15, 1891.

In Fig. 4 the arrangement is somewhat different. The connections are reversed in position and the coil connected to commutator K' is the one influenced by both sections of the field, while that connected to K is influenced only by the constant field C. In this case the direct coil F on the differential field section C' is connected in series through the brushes and commutator K', and its effect operating differentially with the shunt winding on the same core is to enhance the armature-winding connected to commutator K' relative to that connected to K when a considerable current is being transferred from the intermediate wire to the outer mains. For this purpose the windings S S' will be arranged to produce opposite poles in their relative field-sections and the winding F will tend to overcome S', and make the polarities of the field-sections the same under load, while they are opposite under no load—that is, when there is no current in coil F. The regulating effect of the connection last described is the same as in Fig. 3 and for the same purpose.

What we claim as new, and desire to secure by Letters Patent, is—

1. The combination, with a multiple-series distribution system, of an equalizer connected to the intermediate conductor and reconverting the excess of energy into an electro-motive-force-feeding current to the outer mains, as described.

2. The combination, in a multiple-series distribution system, of a by-path around one of the multiple-arc groups, through which the excess of energy is shunted, and an equalizer reconverting said shunted energy into an electro-motive-force-returning current to the outer mains at a potential similar to that maintained thereupon by the main source of supply.

3. In a multiple-series distribution system, a generator of electro-motive force in circuit with the outer mains and driven or energized by the excess of energy shunted around one of the multiple groups.

4. The combination, in a multiple-series distribution system, of a motor-generator having its generator terminals connected to the outer mains in multiple with the main source of supply and its motor terminals connected in shunt around one of the multiple groups, with a circuit-controller for shifting the motor from one branch of the system to another.

5. The combination, in a multiple-series distribution system, of a motor-generator connected as described and returning the excess of energy to the outer mains, with an automatic shifter responsive to differences of potential on the said multiple groups for shifting the motor connections so as to insure the above-described equalization.

6. The combination, in a multiple-series distribution system, of a motor-generator connected as described for returning the excess of energy to the outer mains, with means of regulation automatically compensating for drop of potential under varying loads, as set forth.

7. The combination, in a multiple-series distribution system, of a motor-generator returning the excess of energy to the outer mains, with means for altering the relation between the effective lengths of the motor and generator windings by the flow of current over the intermediate wire, and thereby compensating for drop of potential, as described.

In testimony whereof we have hereto set our hands this 9th day of March, 1891.

ELIHU THOMSON.
EDWIN WILBUR RICE, Jr.

Witnesses:
JOHN W. GIBBONEY,
JOHN T. BRODERICK.